(12) United States Patent
Huang et al.

(10) Patent No.: US 8,724,305 B2
(45) Date of Patent: May 13, 2014

(54) ELECTRONIC DEVICE WITH QUICK-RELEASE SUPPORTING APPARATUS

(75) Inventors: Ri-Dong Huang, Shenzhen (CN);
Chang-Zheng Xu, Shenzhen (CN);
Hsuan-Tsung Chen, New Taipei (TW);
Guang-Yao Lee, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 118 days.

(21) Appl. No.: 13/467,056

(22) Filed: May 9, 2012

(65) Prior Publication Data
US 2013/0063875 A1 Mar. 14, 2013

(30) Foreign Application Priority Data
Sep. 8, 2011 (CN) .......................... 2011 1 0265595

(51) Int. Cl.
*G06F 1/16* (2006.01)

(52) U.S. Cl.
CPC ..................................... *G06F 1/1624* (2013.01)
USPC ................. 361/679.22; 320/107; 248/226.11; 455/556.2

(58) Field of Classification Search
CPC ..................................... G06F 1/00; H05K 1/00
USPC .......................... 345/168, 156, 173, 204, 211;
455/575.4, 556.1, 575.1, 558, 556.2;
248/122.1, 636, 226.11, 158, 170,
248/188.8; 312/223.1, 223.2, 223.3, 245,
312/111, 140; 361/679.08, 679.31, 679.33,
361/679.56, 679.58, 679.26, 679.4, 679.6,
361/679.02, 679.27, 679.05, 679.04,
361/679.01, 679.06; 320/107, 115
See application file for complete search history.

(56) References Cited

U.S. PATENT DOCUMENTS

2013/0148282 A1* 6/2013 Chen ......................... 361/679.08
2013/0162212 A1* 6/2013 Wu .............................. 320/115

* cited by examiner

*Primary Examiner* — Hung Duong
(74) *Attorney, Agent, or Firm* — Novak Druce Connolly Bove + Quigg LLP

(57) ABSTRACT

An electronic device includes a main body, a base, a connecting member, a securing pole, a locking member, a sliding block. The main body includes a securing groove having a securing region, and a securing hole is defined on the bottom of the securing region. The connecting member is mounted between the main body and the base, and the connecting member comprising a channel. The securing pole is slidably received in the channel of the connecting member. The locking member is slidably received between the connecting member and the base, and forces the securing pole to disengage from the securing hole when the locking member is pushed. The locking member includes a second bevel abutting to a first bevel of the sliding block. When the locking member is pushed, the sliding block is actuated to pull the securing pole away from the main body.

8 Claims, 7 Drawing Sheets

ELECTRONIC DEVICE WITH QUICK-RELEASE SUPPORTING APPARATUS

BACKGROUND

1. Technical Field

The present disclosure relates to an electronic device, and more particularly, to an electronic device with a quick-release supporting apparatus.

2. Description of Related Art

An electronic device, such as a thin client, is often screwed to a stand for sitting on the table. However, it is inconvenient to disassemble the stand from the electronic device when the electronic device needs to be separated from the stand.

Therefore, what is needed is an electronic device with a quick-release supporting apparatus that overcomes the problem.

BRIEF DESCRIPTION OF THE DRAWINGS

The components in the drawings are not necessarily drawn to scale, the emphasis instead being placed upon clearly illustrating the principles of an electronic device with a quick-release supporting apparatus. Moreover, in the drawings, like reference numerals designate corresponding parts throughout the several views.

DETAILED DESCRIPTION

Figure 1:
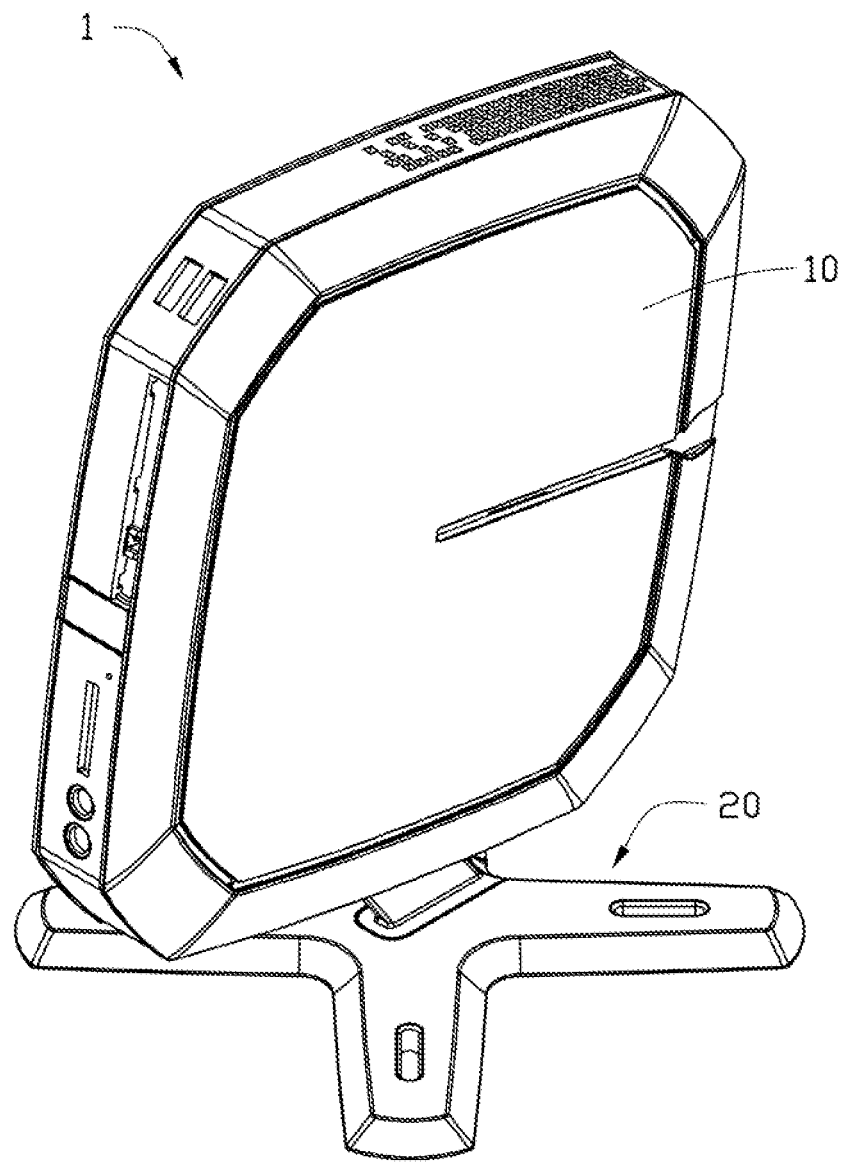
FIG. 1 is an isometric view of an electronic device, in accordance with an exemplary embodiment.

FIG. 1 is an embodiment of an electronic device 1 including a main body 10 and a stand 20 to support the main body 10. In the present embodiment, the electronic device 1 is a thin client.

Figure 2:
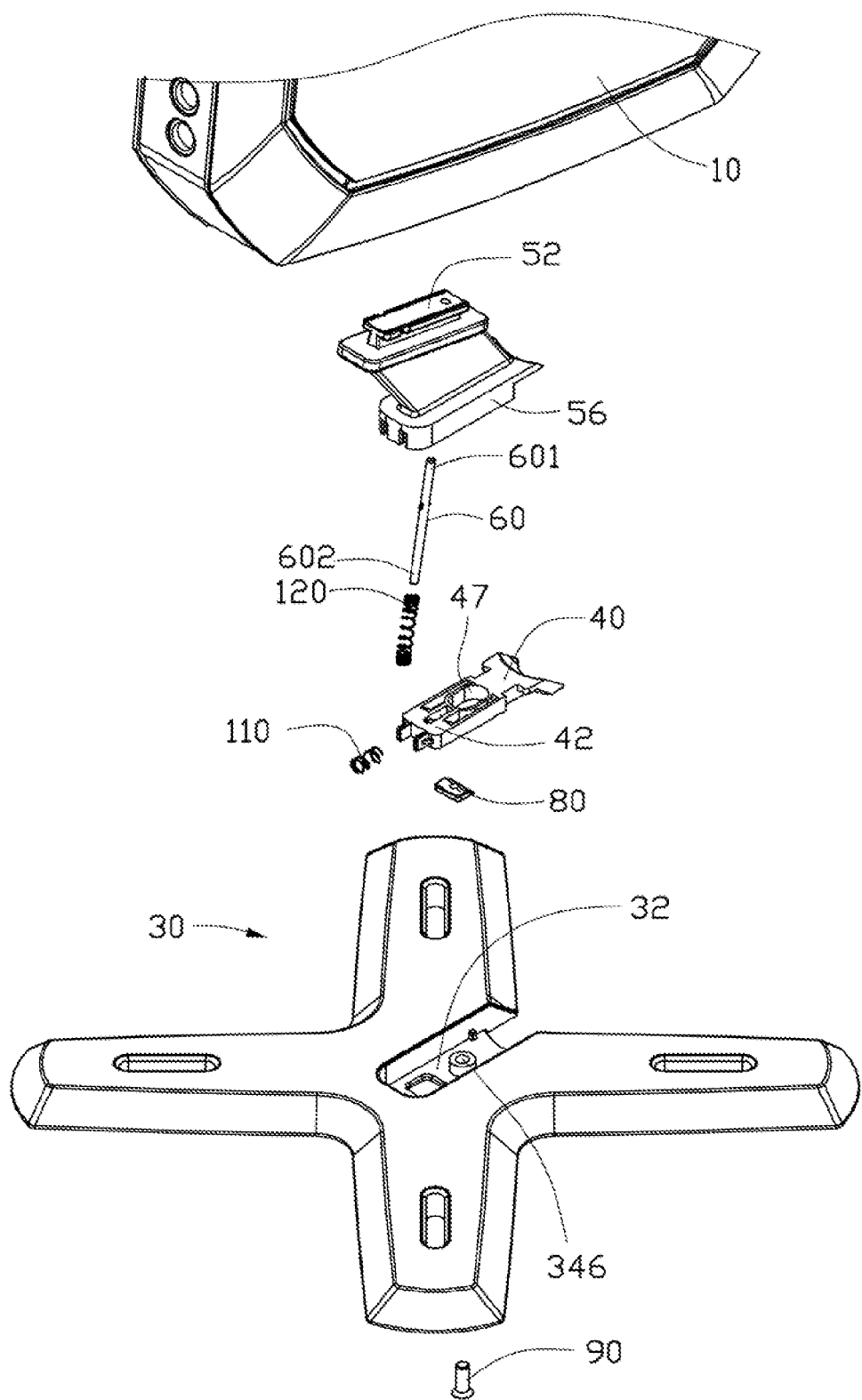
FIG. 2 is an isometric, exploded view of the electronic device of FIG. 1.

FIG. 2 shows the stand 20 further including a connecting member 50, a securing pole 60, a locking member 40, a sliding block 80, a first resilient member 120, and a second resilient member 110. The connecting member 50 has a fastening section 56 for connecting the base 30, and has a securing section 52 to secure the main body 10. A securing end 601 and an actuation end 602 are defined on the securing pole 60, which is slidably received in the connecting member 50. The securing end of the securing pole 60 can protrude from the securing section 52 to engage with the main body 10, and the actuation end of the securing pole 60 penetrates through the locking member 40 and is mounted to the sliding block 80. The locking member 40 is slidably received in the fixing section 56 of the connecting member 50, and pushes the sliding block 80, disengaging the securing pole 60 from the main body 10. The first resilient member 120 pushes the securing pole 60 toward the main body 10, and the second resilient member 110 pushes the locking member 40 away from the sliding block 80 to allow the securing pole 60 to engage the main body 10 when no external forces are pushing the locking member 40 toward the sliding block 80.

Figure 3:
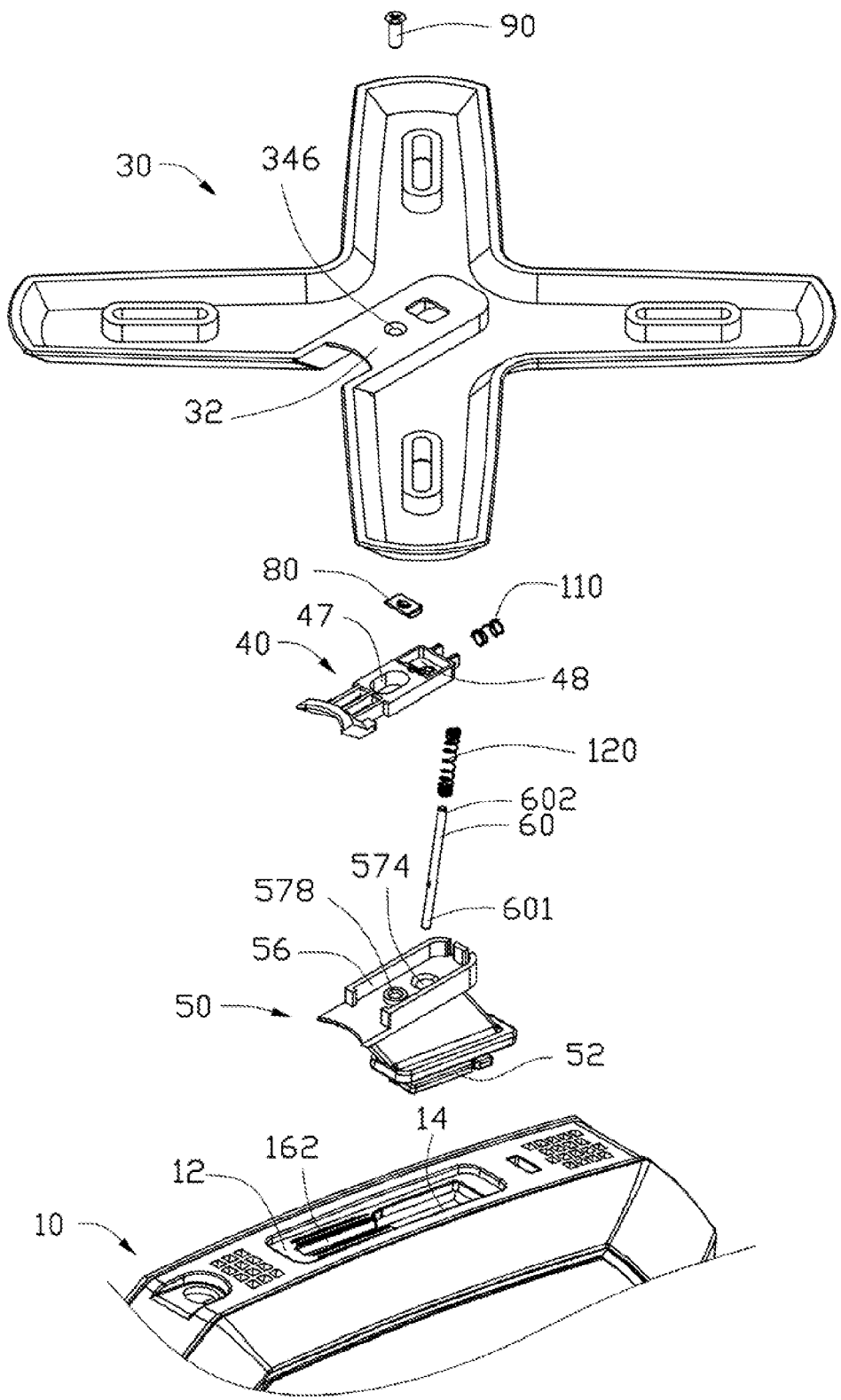
FIG. 3 is an isometric, exploded view of another aspect of the electronic device of FIG. 2.

FIG. 3 shows the fixing section 56 of the connecting member 50 fixed in a recess 32 in a center of the base 30. A first fixing hole 346, a second fixing hole 47, and a third fixing hole 578 are respectively arranged in the recess 32, and the locking member 40, and the fixing section 56. A fixing member 90 penetrates through the first fixing hole 346, the second fixing hole 47, and the third fixing hole 578 to fix the connecting member 50 and the locking member 40 to the base 30. The second fixing hole 47 is obround to allow the locking member 40 to slide between the connecting member 50 and the base 30.

A securing groove 14 is arranged on the bottom of the main body 10 to secure with the securing section 52 of the connecting member 50. The securing section 52 can be received in one end of the securing groove 14, and slide into a securing region 162 of the securing groove 14. The securing region 162 includes a blocking side wall 12 extending from the opening of the securing region 162 to retain the securing section 52. When the securing section 52 slides into the securing region 162, the securing end 601 of the securing pole 60 can engage with a securing hole 18 (See FIG. 7) arranged in the bottom of the securing region 162 to stop the connecting member 50 from sliding out of the securing region 162.

Figure 4:
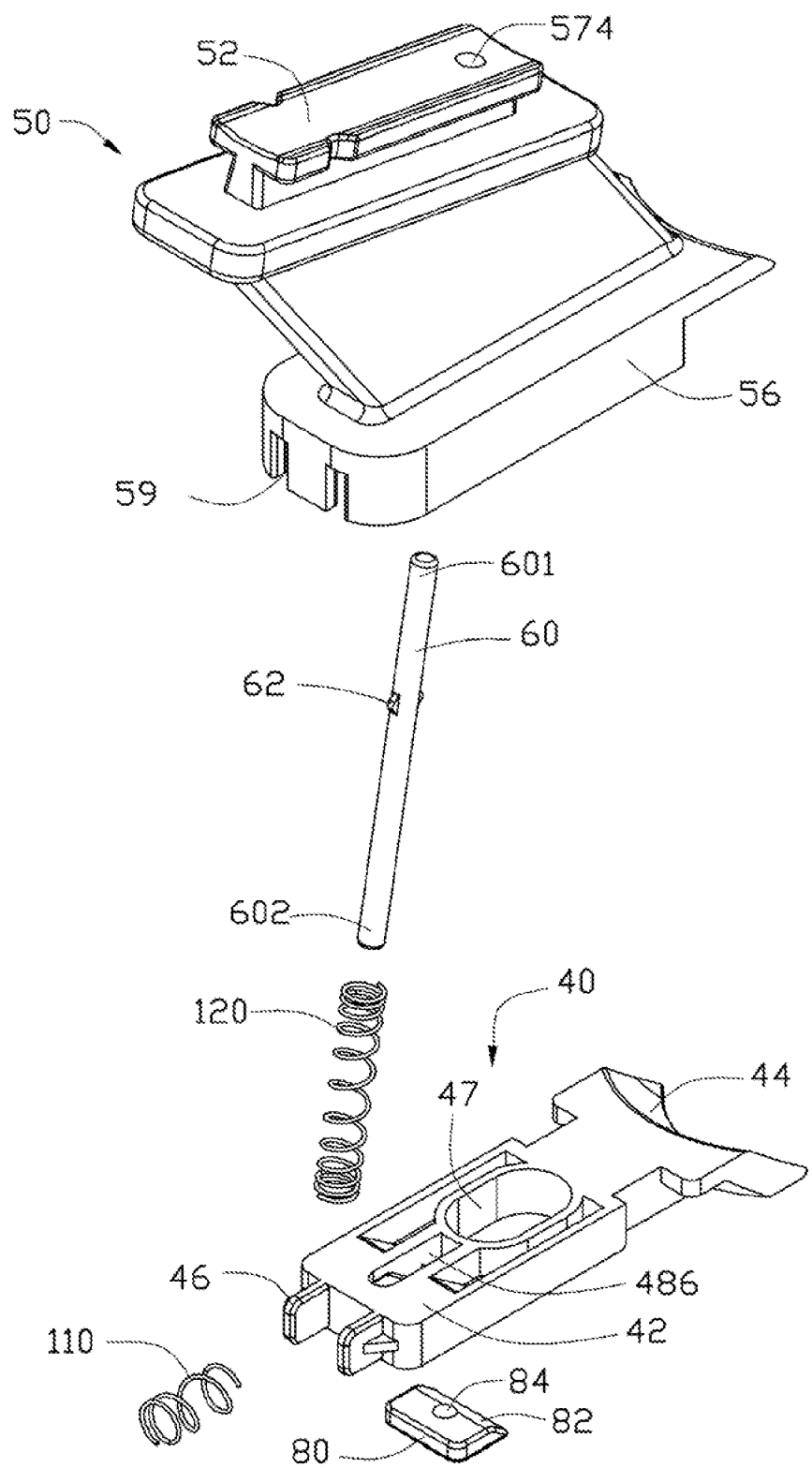
FIG. 4 is an enlarged view of the electronic device of FIG. 2, without a base.
Figure 5:
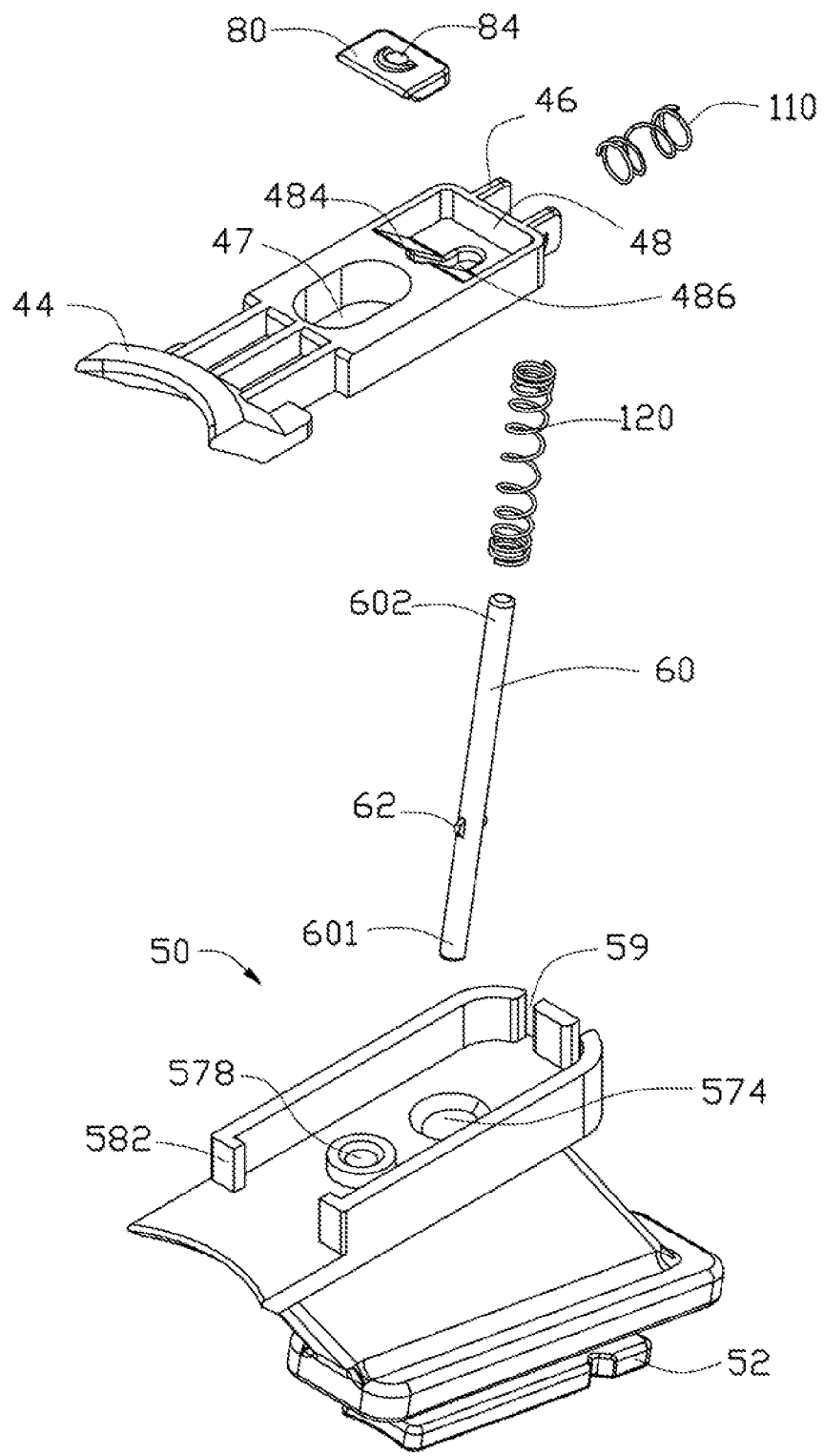
FIG. 5 is an enlarged view of the electronic device of FIG. 3, without a base.

FIGS. 4-5 show two protrusions 62 arranged on the periphery of the securing pole 60. The securing end of the securing pole 60 penetrates through a channel 574 of the connecting member 50. The actuation end of the securing pole 60 penetrates through the first resilient member 120 and a slot 486 on the locking member 40, and is fixed in a mounting hole 84 of the sliding block 80. The first resilient member 120 is restricted between the protrusions 62 and the upper surface 42 of the locking member 40 to push the securing pole 60 toward the main body 10. A chamber 48 arranged in the lower surface of the locking member 40 can receive the sliding block 80, and a first bevel 82 arranged on the sliding block 80 abuts a second bevel 484 arranged in the chamber 48. When the second bevel 484 pushes toward the first bevel 82 of the sliding block 80, the sliding block 80 slides along the second bevel 484 toward the base 30, and pulls the securing pole 60 away from the securing hole 18 of the main body 10.

The second resilient member 110 is restricted between a side wall of the locking member 40 and a side wall of the fixing section 56 of the connecting member 50. The second resilient member 110 keeps the locking member 40 from moving toward the sliding block 80 to allow the securing pole 60 to engage with the securing hole 18 of the main body 10. The side wall of the locking member 40 further extends two side boards 46 to position the second resilient member 110. Two openings 59 on the side wall of the connecting member 50 allow the two side boards 46 to pass when the second resilient member 110 is compressed.

Figure 6:
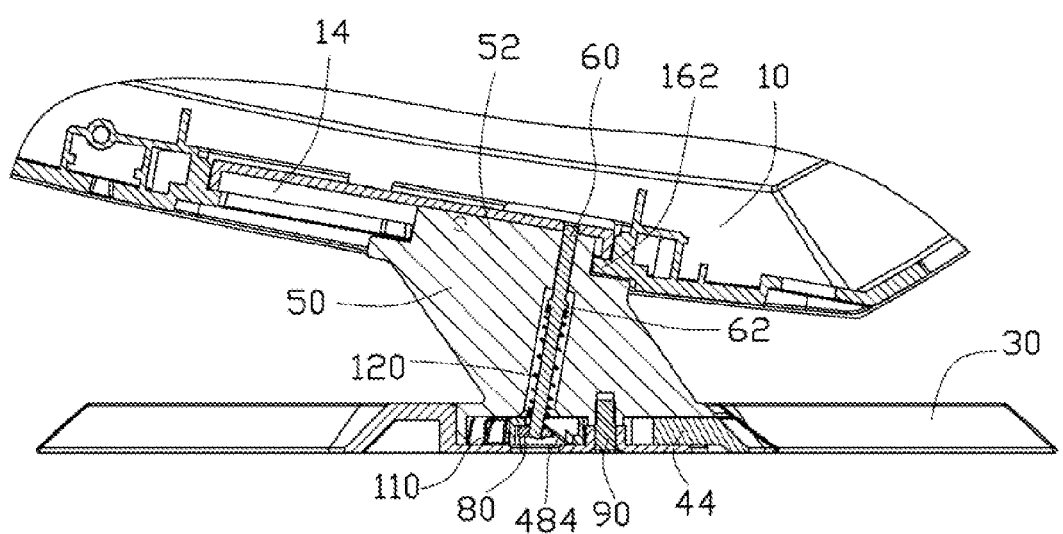
FIGS. 6-7 are cross-sectional views of the electronic apparatus of FIG. 1, showing different engagement states.

FIG. 6 shows when the electronic device 1 is assembled, the second resilient member 110 pushes the locking member 40 away from the sliding block 80 to allow the sliding block 80 and the securing pole 60 to move toward the main body 10, and then the securing end of the securing pole 60 is fixed to the securing hole 18 of the main body 10. The securing section 52 of the connecting member 50 will be secured in the securing region 162 of the connecting groove 14 when the securing end of the securing pole 60 is secured in the securing hole 18 of the main body 10.

Figure 7:
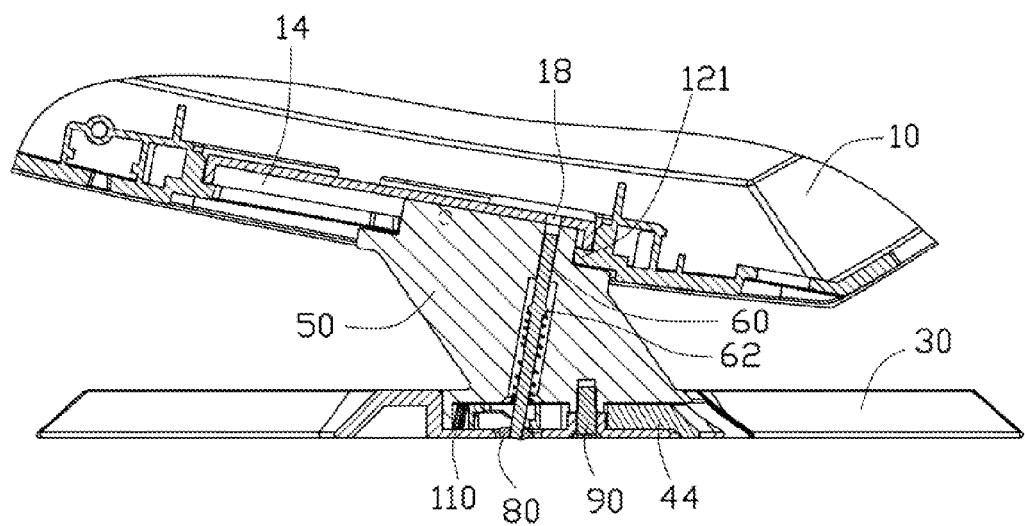

FIG. 7 shows when removing the main body 10 from the stand 20, an actuating portion 44 of the locking member 40 is pushed toward the sliding block 80. The second bevel 484 abuts the first bevel 82 to force the sliding block 80 and the securing pole 60 to slide away from the main body 10, and the securing pole 60 disengages from the securing hole 18. The securing section 52 of the connecting member 50 can slide out of the securing region 162 of the securing groove 14 to release the main body 10.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. An electronic device, comprising:
   a main body comprising a securing groove having a securing region, a securing hole being defined on the bottom of the securing region;
   a base;
   a connecting member mounted between the main body and the base, the connecting member comprising a channel;
   a securing pole slidably received in the channel of the connecting member, wherein a first end of the securing pole engages the securing hole to lock the main body with the connecting member, and disengages from the securing hole to release the main body;
   a locking member slidably received between the connecting member and the base;
   a sliding block with a first bevel, the sliding block being mounted with a second end of the securing pole, opposite to the first end;
   wherein the locking member comprises a second bevel abutting the first bevel of the sliding block; when the locking member is pushed, the second bevel moves the first bevel such that the sliding block pulls the securing pole to disengage from the securing hole.

2. The electronic device as claimed in claim 1, wherein a slot is defined in the locking member, and the second end of the securing pole penetrates from one side of the locking member through the slot and is mounted with the sliding block arranged on the other side of the locking member; the electronic device further comprises a first resilient member restricted between the locking member and a protrusion on periphery of the securing pole to force the securing pole to move toward the main body.

3. The electronic device as claimed in claim 2, wherein a chamber is defined on the other side of the locking member to receive the sliding block, and the second bevel is arranged on a side wall of the chamber.

4. The electronic device as claimed in claim 1, wherein a second resilient member is restricted between the connecting member and the locking member to push the locking member away from the sliding block when the locking member is not pushed.

5. The electronic device as claimed in claim 4, wherein the locking member extends two side boards to retain the second resilient member between the two side boards.

6. The electronic device as claimed in claim 1, wherein the base, the locking member, and the connecting member are fixed together by a fixing member; and the locking member can slide when fixed between the base and the connecting member.

7. The electronic device as claimed in claim 6, wherein an obround fixing hole is defined on the locking member, and the locking member can slide when the obround fixing hole is penetrated by the fixing member.

8. The electronic device as claimed in claim 1, wherein the connecting member comprises a securing section, and the securing groove of the main body receives the securing section; the securing region of the securing groove extends a blocking side wall to retain the securing section of the connecting member; the connecting member is connected with the main body when the securing section are slide into the securing region; the securing end of the securing pole engages the securing hole only when the securing section of the connecting member is retained in the securing region.

* * * * *